United States Patent [19]

Cooper

[11] 4,422,314
[45] Dec. 27, 1983

[54] LOCK FOR A FUEL LINE VALVE

[76] Inventor: Wilbur H. Cooper, 2558 Munger, Houston, Tex. 77023

[21] Appl. No.: 243,595

[22] Filed: Mar. 13, 1981

[51] Int. Cl.³ ..................... B60R 25/04; E05B 15/16; E05B 65/12; F16K 35/10
[52] U.S. Cl. ......................................... 70/242; 70/178; 70/232; 70/416; 70/417; 137/382; 137/385
[58] Field of Search ................. 70/178, 242, 232, 177, 70/416, 417, DIG. 70, 163, 166–168, 34, 211; 137/382, 385, 383; 292/254, 213, 218, 214

[56] References Cited

U.S. PATENT DOCUMENTS

| 595,424 | 12/1897 | Adams | 292/254 X |
|---|---|---|---|
| 985,100 | 2/1911 | Austin | 137/383 |
| 1,186,636 | 6/1916 | Willcox | 137/385 X |
| 1,279,954 | 9/1918 | Williams | 137/383 |
| 1,290,064 | 1/1919 | Brown | 70/178 X |
| 1,310,362 | 7/1919 | Melton | 137/382 |
| 1,328,616 | 1/1920 | Cassingham et al. | 70/242 |
| 1,390,674 | 9/1921 | Cummings | 70/178 X |
| 1,501,934 | 7/1924 | Wise | 70/232 X |
| 1,574,522 | 2/1926 | Stone | 137/382 |
| 1,633,639 | 6/1927 | Johns | 70/232 |
| 1,683,932 | 9/1928 | Summers | 70/232 |
| 1,782,584 | 11/1930 | Ryan | 70/178 X |
| 1,805,779 | 5/1931 | Metz et al. | 70/232 |
| 1,815,580 | 7/1931 | Otte | 292/218 |
| 1,921,225 | 8/1933 | Hawkins | 70/232 X |
| 3,172,282 | 3/1965 | Heckrotte | 70/178 |
| 3,540,468 | 11/1970 | Finck | 70/178 X |
| 3,802,233 | 4/1974 | Riley | 292/218 X |
| 3,844,143 | 10/1974 | Hudson | 70/232 X |
| 4,024,740 | 5/1977 | DiGiovanni | 70/178 X |
| 4,133,142 | 1/1979 | Dzus | 292/254 X |

FOREIGN PATENT DOCUMENTS

| 610036 | 3/1935 | Fed. Rep. of Germany | 137/382 |
|---|---|---|---|
| 720104 | 12/1931 | France | 70/232 |
| 588676 | 2/1959 | Italy | 70/232 |
| 643341 | 2/1962 | Italy | 70/163 |
| 53880 | 2/1923 | Sweden | 292/218 |
| 217649 | 12/1967 | Sweden | 70/211 |
| 368453 | 3/1932 | United Kingdom | 70/178 |

Primary Examiner—Robert L. Wolfe
Assistant Examiner—Carl F. Pietruszka

[57] ABSTRACT

A locking mechanism for fuel lines in vehicles in which at least a part of the unit is constructed of aluminum to resisting flame cutting and hardened steel dowel pins are used to resist saw cutting. The locking mechanism has an internal recess which encloses a fuel line valve in a closed position. The locking mechanism is comprised of two members which are interlocked to one another by a rotatable keying element which is in one member and selectively engages with the other member upon operation of a key to lock the members to one another while the fuel line valve is in a closed position.

3 Claims, 6 Drawing Figures

LOCK FOR A FUEL LINE VALVE

FIELD OF THE INVENTION

This invention relates to locks for protecting vehicles and the like against theft and more particularly, to lock mechanisms which are virtually theft proof for protecting vehicles by requiring either a fuel line to be cut by a thief to remove the lock mechanism or a substantial time to distruct the lock mechanism.

BACKGROUND OF THE INVENTION

Theft of vehicles and particularly commercial trucks and heavy equipment is a wide spread problem. Most heavy equipment must be left on a job site and hence over-night thefts are a problem. Theft of heavy equipment is made relatively simple by use of duplicate keys or hot-wiring about the ignition.

In the present invention a lock mechanism is provided which cannot be easily cut with a saw, cutting torch or drill and thus will resist all but the most determined thiefs. This is because removal or cutting of the fuel line makes it difficult to start the equipment, particularly diesel equipment for a substantial period of time.

THE PRESENT INVENTION

The present invention involves a lock mechanism constructed of aluminum or other material which resists cutting by a cutting torch. The mechanism is made in two parts, one of which has hardened tool steel dowels which interfit into openings in the other part. The hardened dowels are difficult to cut with a cutting saw. A locking means is disposed in one part of the lock mechanism and is selectively operable to lock with the other part of the lock mechanism. A key operated mechanism operates the locking means which is constructed of drill proof material and a pick-proof tumbler. The lock mechanism has a hollow interior sized to receive a fuel valve in a fuel line so that the fuel valve can be enclosed within the lock mechanism.

DESCRIPTION OF THE DRAWINGS

FIG. 3 is a perspective view of the locking mechanism of the present invention in a locked condition on a fuel line;

FIG. 4 is a view in cross-section taken along line 4—4 of FIG. 3;

FIG. 5 is a view in cross-section taken along line 5—5 of FIG. 4; and

FIG. 6 is a view in cross-section taken along line 6—6 of FIG. 5.

DESCRIPTION OF THE INVENTION

Theft of heavy equipment and vehicles is relatively simple by use of duplicate keys or by the hot-wiring of an ignitiion which permits a thief to start the equipment and drive it onto a trailer and off of a site location.

It is a characteristic of diesel equipment in particular that the motor or engine will not function without input of diesel fuel from a positive displacement pump. Also, if the fuel line is cut, then it typically takes about an hour and a half to purge the lines of air and reprime the fuel lines. The present locking mechanism is arranged to encapsulate or enclose a flow line valve in an off position and the locking mechanism is constructed to be very durable in that it is difficult to cut or saw. Thus, the locking mechanism can delay theft of a vehicle for a substantial period of time which is an effective deterent to theft.

Figure 1:
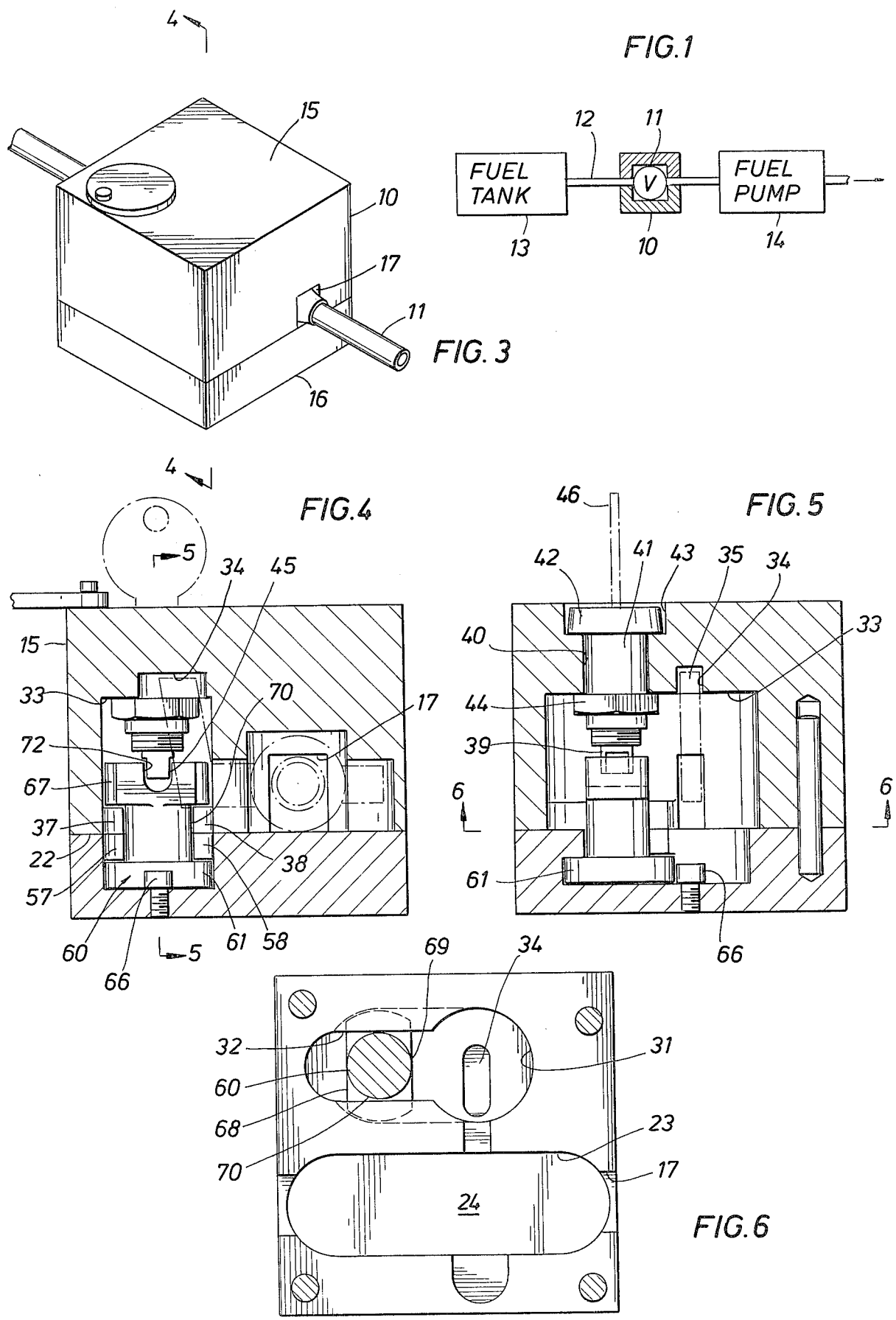
FIG. 1 illustrates in schematic representation of the arrangement of a locking mechanism of the present invention disposed relative to the components of a vehicle.

As illustrated in FIG. 1, a hollow locking mechanism 10 encloses a flow valve 11 in a fuel line 12 which interconnects a fuel tank 13 to a fuel pump 14. If the fuel pump does not receive fuel, the motor cannot be started. The locking mechanism 10 is constructed of materials which make it difficult to cut or saw throught the mechanism. As shown in FIG. 3, the locking mechanism 10 is cubically shaped and has a body member 15 and a lid member 16. If desired, either the body or lid members may be an integral part of an engine or supporting structure. The body member 15 has aligned exterior openings 17 through which the fuel line 12 passes.

Figure 2:
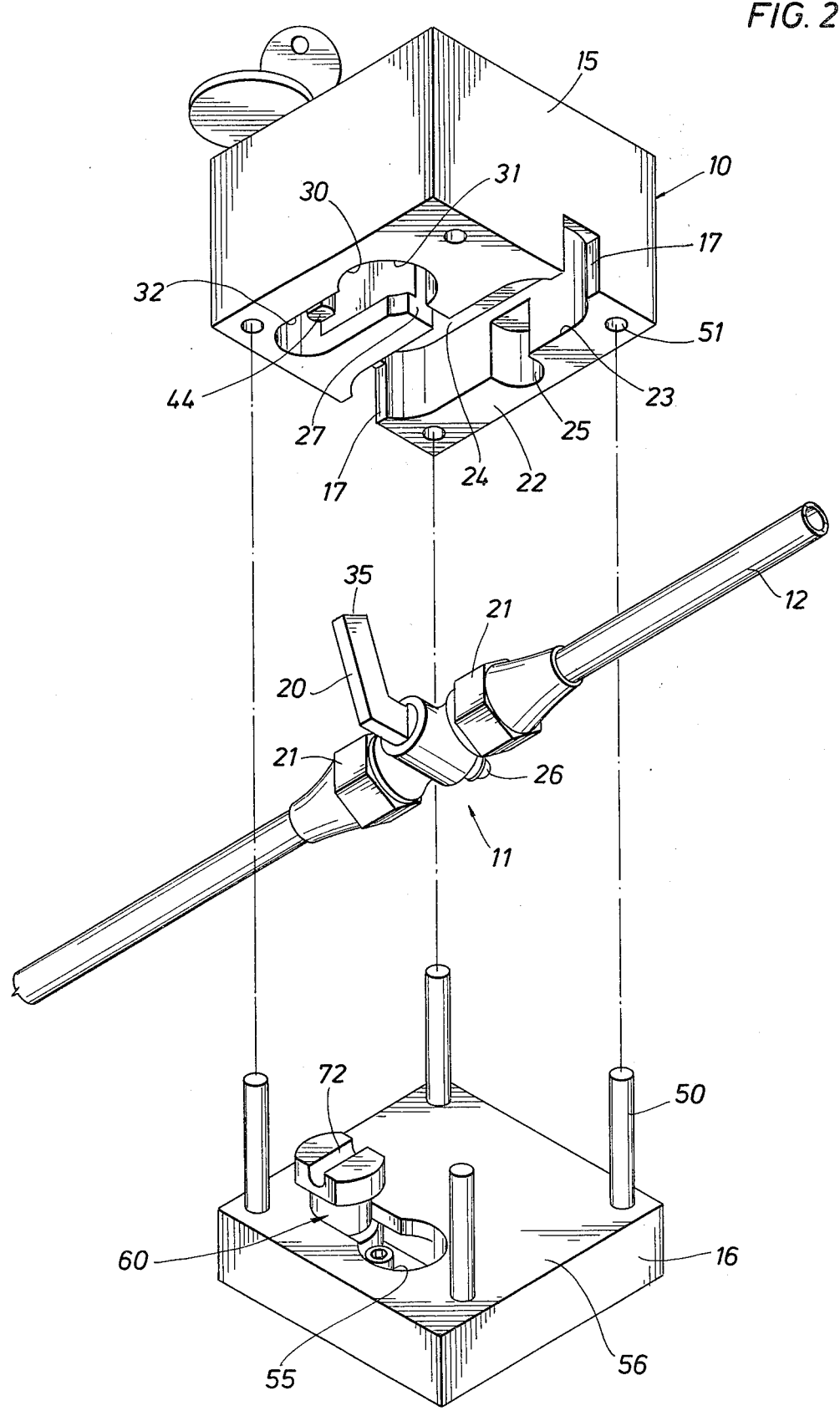
FIG. 2 is a perspective view of the locking mechanism of the present invention relative to a fuel valve and fuel line.

In FIG. 1, the interior of the body member 15 and the lid member 16 are illustrated in relation to a flow valve 11. As shown in FIG. 2, the fuel valve 11 is a typical flow line valve with a rotatable valve element having an elongated valve handle 20. In a position of the valve handle perpendicular to the fuel line 12, the valve element closes the fuel line 12. In a position of the valve handle parallel to the fuel line 12, the valve element opens the fuel line 12 to fluid flow. The valve 11 is connected to the fuel line 12 by threaded brass fittings 21 in a conventional manner.

The body member 15 of the locking mechanism has an inner flat surface 22. Extending inwardly from the inner flat surface 22 is a first elongated recess 23 which extends between the exterior window openings 17. The openings 17 are square shaped and sized to receive the outer diameter of fuel line 12. The elongated recess 23 has an inner recessed flat surface 24 which is parallel to the surface 22. One vertical side wall of the elongated recess 23 has a transverse semi-circular shaped vertical recess 25 which extends inwardly from the flat surface 22 but terminates short of the flat surface 24. The vertical recess 25 is sized to receive the bottom projecting end 26 of the valve element. The other side wall of the elongated recess 23 has a vertical slot 27 which extends inwardly from the flat surface 22 a sufficient distance to receive the valve handle 20 of the valve 11. Juxtaposed next to the first elongated recess 23 is a second elongated recess 30. The elongated recess 30 extends inwardly from the flat surface 22 and has a keyhole shaped configuration at the flat surface 22. The keyhole configuration includes a circularly shaped portion 31 and an elongated slot portion 32. The circularly shaped portion 31 extends from the flat surface 22 to a rearward recessed flat wall 33 in the recess 30 (FIG. 5). The flat wall 33 is parallel to the flat surface 22. An elongated locking recess 34 extends inwardly into the body from the flat wall 33 (FIG. 5) and is sized to receive the tip end 35 of the valve handle 20 when the valve is in the body thereby to lock the valve handle in a closed position of the valve. Thus, the valve handle 20 cannot be moved to an open position while in the body member 15.

The slot portion 32 of the second elongated recess 30 is undercut to form shoulders 37 and 38 (see FIG. 4) between the flat surface 22 and the rearward flat wall 33. Aligned with the slot portion 32 is an oval shaped opening 40 which extends between the exterior wall surface of the body and the rearward flat wall 33. The opening 40 receives an oval shaped locking cylinder 41 which has a flanged head 42. The head 42 of the cylinder 41 is seated in a cylindrical recess 43 in the exterior wall surface and the locking cylinder 41 is attached in place by a nut 44 disposed in the elongated recess 32. The cylinder 41 is commercially available and is made of hardened steel parts which resist drilling.

The key and tumbler for the locking cylinder 41 are made with different angular projections to foil picking of the lock. The locking cylinder 41 has a rotatable projecting pin end 39 disposed within the second elongated recess 32 which has flattened surfaces 45 which interfit with a locking device as will be hereinafter explained. The pin end 39 is rotated by a properly fitted key 46 between 90° rotational positions with respect to the locking cylinder 41.

The lid member 16 is provided with four hardened tool steel pins 50 which are respectively recieved within matching openings 51 in the body member 15. The pins and openings have a length sufficient to straddle the width of the valve 11. The pins 50 are seated in blind openings in the lid member 16 so that the location of the pins 50 is not discoverable from the outside. The pins 50 are offset from one another so that the lid member fits on the body member in only one positional relationship.

In the lid member 16 is a second keyhole shaped recess 55 which extends inwardly from an inner flat surface 56 on the lid member. The flat surface 56 is parallel and matching to the flat surface 22. The keyhole recess 55 has an undercut section forming locking flanges 57, 58 (see FIG. 4). A rotatable, spool-shaped locking element 60 has one end with a cylindrically shaped flange 61 rotatably received within the undercut section of the recess 55 and is retained therein by the flanges 57, 58. The undercut section of the recess 55 has a curved surface to rotatably receive the flange 61. A circular shaped pin 66 is disposed in the recess on the side of the flange 61 to retain the flange 61 in the undercut section of the recess. The central axis of the pin 66 is aligned in a vertical plane with the central axis of the flange 61. The other end 67 of the locking element 60 has an elongated shape with parallel vertical side faces 68, 69 which tool pins 50 prevent cutting with a saw. While the system is illustrated as two pieces it is obvious that one of the parts can be integrated into a motor or housing as an integral part of the equipment. With the forgoing system the lock cannot be easily removed and thus, it inhibits theft.

I claim:

1. An anti-theft device for protecting vehicles against theft by locking a fuel line valve in a closed position comprising:
   a solid body member constructed of aluminum and having a recess for receiving a fuel line valve and valve handle in a closed position for preventing flow through the valve, said recess having openings for receiving piping attached to the valve;
   a lid member constructed of aluminum and adapted to cover said recess and said openings for enclosing a fuel line valve in a closed position within said body member;
   pin means extending transverse to said lid member and disposed within said lid member and said body member when said lid member covers said recess, said pin means being constructed of hardened steel;
   locking means for interconnecting and releasing said lid member relative to said body member including lug means in one of said lid member and said body member said lug means being rotatable between an interconnecting position locking said lid member to said body member and a released position unlocking said lid member relative to said body member and including key operating means in the other of said lid member and said body member for rotating and lug means, said key operating means and said lug means having means for connecting said key operating means and said lug means to one another when said lid member covers said recess.

2. A lock for enclosing a fuel line valve of a vehicle for anti-theft purposes comprising:
   a base member and a lid member constructed of aluminum and having engaging wall surfaces; transverse pin means constructed of hardened steel for interconnecting said base member and said lid member at locations about the periphery of said base member and said member;
   said base member having means defining a first interior recess for receiving a fuel line valve in a defined fixed position and having openings for receiving piping attached to the valve;
   one of said base member and lid member having means defining a second interior recess for receiving a locking element;
   locking means in said one of said base member and lid member and rotatable by key means between rotational positions of locking and unlocking;
   the other of said base member and lid member having a locking element receivable in said second interior recess and rotatable between positions of locking and unlocking relative to said second interior recess;
   means on said locking element and locking means for interconnecting said locking element and said locking means when said wall surfaces of said members are in engagement and said locking element is disposed in said second interior recess; and
   said second interior recess having means for cooperating with said locking element in said locking position for locking said base and lid members to one another.

3. A lock for enclosing a fuel line valve of a vehicle for anti-theft purposes comprising:
   a body member constructed of aluminum and having a first elongated recess extending inwardly from a first flat surface for receiving a fuel line and fuel valve where the configuration of said first recess is such that said valve is locked in a fixed position in said body member;
   said body member having a second elongated recess extending inwardly from said first flat surface said second recess having locking flanges and a locking cylinder, said locking cylinder being arranged for operation from the exterior of said body member to rotate a keying member within said second recess; and
   a lid member constructed of aluminum and having a rotatably mounted locking element, said locking element projecting outwardly from a second flat surface and having locking lugs, said locking lugs being receivable within said second elongated recess and having means engagable with said keying member whereby said locking lugs may be rotated into locking engagement with said locking flanges, said lid member having projecting hardened steel dowels received within openings in said body member where said openings are disposed about said first elongated recess.

* * * * *